United States Patent
Kowalski (10) Patent No.: US 6,713,104 B1
(45) Date of Patent: Mar. 30, 2004

(54) PROCESS AND DEVICE FOR PRESERVING THE PHYSICAL CHARACTERISTICS OF CUT SEAFOOD DURING HANDLING AND TRANSPORTATION

(76) Inventor: William R. Kowalski, 2161 Kalia Rd., Apartment 303, Honolulu, HI (US) 96815

(*) Notice: Subject to any disclaimer, the term of this patent is extended or adjusted under 35 U.S.C. 154(b) by 55 days.

(21) Appl. No.: 09/708,993

(22) Filed: Nov. 7, 2000

(51) Int. Cl.[7] .............. A22C 25/12; A23B 4/00; B65B 25/00
(52) U.S. Cl. .............. 426/124; 426/129; 426/132; 426/396; 426/420
(58) Field of Search .............. 426/129, 124, 426/132, 396, 420, 643

(56) References Cited

U.S. PATENT DOCUMENTS

| | | | | |
|---|---|---|---|---|
| 2,041,986 A | * | 5/1936 | Wetmore | 426/643 |
| 2,179,376 A | * | 11/1939 | McDonald | 426/124 |
| 2,245,064 A | * | 6/1941 | Bemiss | 426/124 |
| 2,295,478 A | * | 9/1942 | Jason | 426/124 |
| 2,776,215 A | | 1/1957 | Thomas | |
| 2,776,216 A | * | 1/1957 | Thomas | 426/124 |
| 2,809,896 A | * | 10/1957 | Pierson et al. | 426/124 |
| 3,018,938 A | * | 1/1962 | Tolaas et al. | 426/129 |
| 3,212,907 A | * | 10/1965 | Caprioli | 426/124 |
| 3,671,272 A | | 6/1972 | Mixon | |
| 3,876,812 A | | 4/1975 | Peters | |
| 3,912,823 A | * | 10/1975 | Kane | 426/129 |
| 4,125,633 A | * | 11/1978 | Vander Lugt | 426/124 |
| 4,301,920 A | | 11/1981 | Boggs | |
| 4,664,922 A | * | 5/1987 | Leon et al. | 426/129 |
| 4,728,521 A | * | 3/1988 | Mitchell | 426/129 |
| 4,762,722 A | * | 8/1988 | Izumimoto et al. | 426/129 |
| 4,798,728 A | * | 1/1989 | Sugisawa et al. | 426/129 |
| 4,812,320 A | * | 3/1989 | Ruzek | 426/129 |
| 4,946,326 A | * | 8/1990 | Schvester et al. | 426/129 |
| 5,164,211 A | | 11/1992 | Comer | |
| 5,377,855 A | | 1/1995 | Cook, Jr. et al. | |
| 5,863,576 A | * | 1/1999 | Guarino | 426/129 |
| 6,004,605 A | | 12/1999 | Comer et al. | |

FOREIGN PATENT DOCUMENTS

| | | | | |
|---|---|---|---|---|
| FR | 2539105 | * | 7/1984 | 426/129 |
| FR | 360720 | * | 3/1990 | 426/129 |
| GB | 2052443 | * | 1/1981 | 426/129 |
| GB | 2231322 | * | 11/1990 | 426/129 |
| JP | 58-98058 | * | 6/1983 | 426/129 |
| JP | 59-106253 | * | 6/1984 | 426/129 |
| JP | 3-256871 | * | 11/1991 | 426/129 |
| JP | 3-289470 | * | 12/1991 | 426/129 |

OTHER PUBLICATIONS

Sea Fish Industry Authority, UK., Sea Fish Report No 381 426/129 Denton, Development for Guidelines for Packaging of Chilled Fish . . . Aug. 1990.*

* cited by examiner

Primary Examiner—Steven Weinstein
(74) Attorney, Agent, or Firm—Martin E. Hsia (57) ABSTRACT

A plurality of flat rigid supports protect flat surfaces, flexible membranes protect contoured surfaces, and intersections of these rigid and flexible surfaces form joints that protect the corners and edges of cut seafood such that the physical shape of each packaged seafood segment resembles its freshly cut shape. Cut seafood surfaces, corners, and edges protected by this supporting means avoid contact with other surfaces that may disfigure their original cut appearance. This supporting means accommodates varying seafood fillet sizes and shapes, and minimizes the unused space within the packing unit. As a result, a substantial cost savings is realized by shipping seafood fillets with the weight and volume of non-edible portions of the whole fish removed prior to shipping without compromising the quality of the delivered product.

17 Claims, 6 Drawing Sheets

PROCESS AND DEVICE FOR PRESERVING THE PHYSICAL CHARACTERISTICS OF CUT SEAFOOD DURING HANDLING AND TRANSPORTATION

TECHNICAL FIELD

This invention relates to a process to maintain the original physical condition of seafood fillets throughout processing, handling, and distribution. The process prevents physical deformation of seafood fillets and preserves physical appearance, including flat cut surfaces, sharp corners, curved corners, and natural contours. Furthermore, the biological characteristics of the fillets are preserved including meat color, texture, moisture retention, and microbial shelf life, These characteristics are the vital signs, or "vitality", of the fresh seafood fillets, and their preservation make the fillets appear as if they were recently cut from a fresh whole fish.

This invention is uniquely valuable in processing large-size seafood species that require extensive cutting, which results in a high percentage of exposed cut surfaces, varying shapes, and corners. These delicate areas of the seafood meat are vulnerable to damage. The present invention utilizes a plurality of rigid supports to prevent damage to the exposed surfaces and corners. In addition, shipping such rigidly supported seafood meat with the inedible portions removed substantially reduces transportation and processing costs, and allows the product to be distributed more expeditiously upon receipt.

The primary seafood species to be processed are tuna, swordfish and other seafood that tend to lose their vitality after filleting during distribution without the process described herein. Although this process is primarily intended for use with fresh seafood fillets, it can also be used to preserve the vitality of fresh loins that are subsequently frozen as well as for other foods.

Fresh tuna are typically traded in a whole condition to preserve the quality of the fish. However, the high cost of airfreight increases the cost to the end consumer for the net yield of edible fillet. Previous attempts to economize air transportation cost by filleting tuna at distant supply sources and shipping it to the U.S. market have resulted in damaged, defective, and inferior quality product that is unacceptable to U.S. tuna buyers. It is the object of my invention to overcome these defects such that high quality tuna loins processed at the supply source can compete with fresh domestic cut loins, at a substantial cost savings and convenience to the wholesaler, retailer and consumer.

Therefore, it is the intention of my process to preserve the vitality of the seafood, so that the loins after transportation and distribution appear similar to loins immediately after being cut from whole fish. This invention further relates to an apparatus and process that provides a supporting means to maintain the natural bodily structure of the fillets and a subsequent process to preserve the seafood color, texture, and biological condition, thus preventing premature deterioration and decomposition.

My process controls all aspects, including physical, aesthetic, and biological attributes, so that the packaged fresh loins maintain their fresh condition after processing, transporting, storage and distribution. Further, it was discovered unexpectedly that the process of this invention extends beyond preservation into restoration of physically damaged product. Through experimentation it was found that miss-cut, or otherwise physically defective fillets can be repaired by using my supporting means to reform the damaged fillets into their original fresh-like structure, thus reviving freshly cut appearance.

With the increasing consumption of seafood throughout the world, there is a need for new technologies to preserve the vitality of seafood fillets, particularly the fresh physical condition of the fillets so that they appear freshly cut throughout transportation, storage, and distribution.

Therefore, it is an object of the present invention to provide a process where the physical shape of a filleted seafood segment resembles the physical shape of the same seafood segment when freshly cut from the whole fish.

It is a still further object of this invention to provide a supporting means made of at least two rigid supports to maintain the fresh-like bodily structure of seafood fillets.

It is a further object of this invention to employ a plurality of rigid supports to maintain the flatness of flat cut surfaces, the sharpness of the cut corners, the curve of curved corners, and the contours of contoured surfaces of the fillet.

It is a still further object of this invention to provide a supporting means with two rigid supports that intersect to form a fitted joint to maintain and reform the fillet corners.

It is a still further object of this invention to provide a supporting means with one rigid support and a flexible plastic membrane that intersect to form a semi-fitted joint to maintain the corners of the fillet.

It is a still further object of this invention to fix or adjust the angles of the rigid intersecting supports to be parallel with flat cut seafood surfaces that intersect to form corners.

It is a still further object of this invention to protect the flat cut seafood surfaces with the rigid supports and to protect the seafood corners with the corners formed by the intersecting rigid supports.

It is a still further object of this invention to position two rigid supports of the supporting means at perpendicular angles to one another forming a V shaped trough that accommodates varying sizes of loins and provides cross member support to increase strength of the supporting means.

It is a still further object of this invention to mate a loin into a V shaped trough and to eliminate space between the loin and the surfaces of trough, without substantially distorting the loin.

It is a still further object of this invention to repair physically damaged seafood by forming flat cut surfaces or sharp corners with the supporting means.

It is still a further object of this invention to incorporate a plurality of rigid supports into a vacuum pouch to form a supporting means unit.

It is a still further object of this invention to use a jig to prop the supporting means during assembly.

It is a still further object of this invention to incorporate fasteners within the supporting means that hold the rigid supports in a fixed position.

It is a still further object of this invention to vacuum seal a plastic membrane to a plurality of rigid supports containing seafood fillets.

It is a still further object of this invention to expose fillets to a gas containing carbon monoxide, such as tasteless smoke, to maintain fresh-like color, prevent oxidation, and extend microbial shelf life.

It is still a further object of this invention to provide a supporting means with at least two tapered sides forming a V to hold a fillet with two tapered sides forming a V, and to nest the outer V of the fillet into the inner V of the supporting means, such that the tapers of the V of the supporting means and the V of the fillet are substantially the same, and the support will accommodate varying sizes of fillets.

It is a still further object of this invention to treat the fillets with a liquid solution to stabilize color, inhibit bacteriological growth, and extend the microbial shelf life.

It is still a further objective of this invention to provide an absorbent means to prevent discoloration, staining and decomposition at the surface of the seafood fillet.

It is still a further objective of this invention to incorporate a temperature-monitoring device to constantly monitor the temperature of the seafood fillet.

It is still a further objective of this invention to fillet seafood at foreign fisheries resources to reduce airfreight cost, but without reducing the quality of the seafood fillets.

BACKGROUND ART

For centuries, seafood has been consumed cooked in the U.S. and around the world. Seafood is both cooked and consumed raw as a staple food in the Japanese diet. The Japanese sashimi market draws the highest price among all seafood markets. Red color tuna meat with a fresh-like physical condition draws the highest price in both the U.S. and Japan Tuna is the primary species consumed raw for sashimi. Japanese imports of tuna increased three times in quantity and five times in value from 1984 to 1993. The increase in value is directly associated with the demand for imported tuna needed to supply the Japanese sashimi market.

The popularity of sashimi in the Japanese "Bubble Economy" of the late 80's and early 90's fueled an expansion of sashimi tuna distribution deep into the Japan retail market, including even the smallest of convenience stores. The huge size of the Japanese market for high value sashimi tuna offered its suppliers the convenience of distributing as much product as could be produced through the Japanese auction system, which retains only a modest marketing fee. The stability and convenience of this market, combined with the speed and reliability of payment from the auctions, provided an opportunity that was very attractive to many investors who foresaw the future expansion of the sashimi industry in Japan.

This opportunity spurred large-scale investment by Mainland Chinese and Taiwanese to expand tuna fishing fleets to supply the Japanese market During this period over 500 vessels were launched to fish sashimi tuna in the Pacific. New satellite fisheries bases were established and existing fisheries operations were expanded. These new fisheries bases were largely set up in island communities throughout the Pacific that had unexploited long line tuna stocks, proximity to Japan, and reliable airfreight service at reasonable prices to the Japan auction markets.

As an offshoot of the Mainland Chinese and Taiwanese development of new fisheries bases, domestic Japanese fleets began to develop, further increasing the supply capacity of tuna from the Pacific destined for Japan. However, from 1995 to 1999 the "asian economic crisis" severely impacted the Japanese economy, resulting in a dramatic decrease in the value of the Yen. This weakening of the Japanese economy, combined with the increase of raw tuna supply to Japan, caused periodic decreases in the price for raw tuna in the Japanese auction market.

At the same time, the U.S. economy remained stable and the market demand and price for high quality fresh tuna increased. The numbers of sushi bars, Japanese restaurants and American restaurants serving sashimi has dramatically increased over the past five years. Fresh tuna is among the fastest growing seafood in U.S. retail and food service markets. Recent U.S. market prices for high quality tuna with bright red color have increased to levels that are often competitive with prices in Japan.

C. J. S. Thomas, U.S. Pat. No. 2,776,215, Jan. 1, 1957 discloses a process to wrap eviscerated fish against a flat base member (claim 1) whereas the stiff base element reinforces the packaged product from distortion (column 2, line 47.) However, Thomas' invention is directed towards eviscerated fish (claim 1,2,3,5,6,7,8,9,10,11) and not cut fish fillets. Thomas teaches against the present invention by compressing the curved surface of an eviscerated fish against a flat base plate element. Therefore, Thomas distorts the curved meat surface by conforming it to the contacting flat surface of a base plate element column 4, line 60. The present invention is limited to contacting flat cut surfaces of the food against flat rigid surfaces of the package, thereby avoiding the distortion of Thomas.

Further, the base element of Thomas is a single-plane, one-dimensional support for whole foods, while the supporting means of the present invention is a multiple-plane, three dimensional support with specified joints for cut food.

G. A. Mixon, U.S. Pat. No. 3,671,272, Jun. 10, 1972 teaches a packing method to preserve meat products wherein all the meat portions are of substantially the same size and weight (column 1, line 37.) However, the present invention is directed towards cut foods that vary in size.

Peters, U.S. Pat. No. 3,876,812, Apr. 8, 1975 utilizes a novel container with a hammock for transporting and roasting meats. However, Peters' method is only applicable to meats that can be roasted (column 1, line 46.) It is unconventional to roast fish. Further, Peters fails to incorporate flat rigid supports against the product and eliminate airspace between the package and the product.

Comer, U.S. Pat. No. 5,164,211, Nov. 17, 1992 and U.S. Pat. No. 6,004,605, Dec. 2, 1999 both teach the use of plastic caps (abstract.) Comer clearly teaches against my invention which is limited to boneless meats.

Boggs, U.S. Pat. No. 4,301,920, introduces a bag device for preserving and packing game fish. However, Boggs is directed towards whole fish and he fails to incorporate flat rigid supports to protect flat cut fillet surfaces and corner (abstract.)

U.S. Pat. No. 5,377,855 by Cook, Jr. et al. teaches against the present invention by promoting deformation of fillets within the recesses of his package abstract.

No one to date has created a method to preserve the physical condition of fresh fillets during handling, transportation, and distribution. Yet, huge resources of fresh tuna from the Pacific region have developed as potential supply for the U.S. market. However, these Pacific locations are very far from the U.S. and airfreight cost is very high.

It has been conventional to transport fresh tuna by airfreight in the whole condition to preserve the quality of the fish. Holding high-grade tuna in a whole condition is very effective in maintaining the fresh-like physical condition of the meat However, the high cost of airfreight imposes a substantial cost burden that results in a higher consumer cost for the edible filleted portions of the whole fish. Filleting the tuna at the foreign fisheries resource before shipping can substantially decrease the airfreight cost, but this has not been viable until now because the fillets could not be successfully shipped to U.S. markets.

Thus, the U.S. seafood industry has been limited to using only fillets cut from whole tuna domestically. Some disadvantages to distributing whole fish rather than loins are:

1. Supply resources of fresh tuna are widely dispersed around the world, often very far from the primary market locations. Thus, whole fish is typically transported by costly airfreight. Import, export and domestic delivery of whole fish by airfreight substantially add to the cost of the yield of useable meat after filleting.
2. The U.S. is the primary market for "stealing" grade fresh tuna However, the majority of fresh tuna consumed in the U.S. is imported from foreign resources. The labor and processing costs at these foreign supply sources is generally much less than in the U.S.
3. Processing whole fish into loins domestically can restrict the speed of distribution, thus burdening the quality of service provided to the customer. Further, delays in distribution can cause financial hardship in a falling market or if the fresh product is held over weekends and holidays.

It is difficult to maintain peak vitality of fresh seafood fillets because of wear-and-tear from handling that damages the delicate fillets during their lengthy delivery through the various distribution channels to the consumer. These fillets commonly endure seven to ten days of handling during which time damage occurs. Fish are handled whole because the delicate meat is kept intact by the skeletal structure of the fish and protected by the skin of the fish Filleting tuna into loins eliminates these natural safeguards and exposes the delicate meat to both physical and biological damage. By contrast, my light-weight supporting structure replaces the heavy skeletal structure and provides equal or greater protection to the meat with the economies and added benefits described herein.

Therefore, previous processes prior to my invention have been ineffective in protecting the vitality of fillets throughout processing, handling, transportation, and distribution.

SUMMARY OF THE INVENTION

My process is a unique method that preserves the appearance of fresh cut tuna loins packed to a maximum density for transportation, handling, and storage without damaging the physical condition of the loins. The fresh cut condition of my fresh loins is preserved, including the physical shape, meat color, and microbial shelf life.

In my invention, the freshly cut physical characteristics of tuna fillets are maintained by packing the loin segments in a supporting means with a plurality of rigid supports that maintains the natural shape of the loin. Additionally, an absorbent means is preferably incorporated to maintain surface condition of the meat, further enhancing the loin appearance. Gas treatments containing carbon monoxide such as tasteless smoke and/or liquid treatments can be applied to even further influence a desirable meat color and extend the microbial shelf life of the fillets. A packaged fresh tuna loin appearing freshly cut from a whole fish provides a higher value product; potentially at lower prices than domestically cut tuna loins, due to savings in costly labor and airfreight.

The fresh cut physical condition of tuna loins is maintained by placing rigid supports against the cut sides of the loin. For purposes of this invention, "rigid" is defined as having sufficient stiffness to hold the shape of the seafood meat. The flat surfaces of the rigid supports are fixed or adjusted to replicate the angles of the cut fillets. For tuna loins, two rigid supports are positioned at angles to one another to form a V with a corner where they meet. Additional rigid supports can be added intersecting with the first two rigid supports to form additional V's with additional corners. The rigid supports maintain the flatness of the cut sides of the loin, and the V shape protects the corners and allows for varying sizes of fillets. Since some corners of fillets are curved, the intersection of the V shaped rigid supports can be curved to mate with the curved surfaces of the fillet. Various methods can be used to form the curved intersection such as bending, folding, or attaching the rigid supports at a curved angle; filling the inside of a pointed V intersection with a rigid material to match the curve of the fillet corner; or using a soft material that will form to the curve of the fillet corner.

Fitted joints are created where two rigid supports intersect. Semi-fitted joints are created where rigid supports intersect with a flexible membrane such as a plastic vacuum bag material. Capped joints are created where the inside of a fitted joint with a sharp V intersection is filled with a material to curve the joint. Fitted, semi-fitted, and capped joints maintain and protect the corners from damage.

The physical muscle structure of fresh tuna is delicate. Processing whole fish into intricately cut loin sections substantially increases its vulnerability to damage. Tuna loins have a triangular cross section and are tapered at both ends. The varying size and irregular shape of tuna loins are such that they do not seat well against each other in a carton. Thus, once the loin is removed from the skeletal structure of the fish, it is difficult to package and handle without causing damage to the loin. In addition, the delicate fresh tuna meat can be damaged or deformed during processing and by vacuum packing.

My invention is an improvement over conventional bags, boxes, and other processes. The rigid supports provide the protection of the walls of a box, while excluding the disadvantages of bulk, conformity, and contortion to the product. The flexible membrane provides the flexibility of bag without distorting the flat surfaces and corners. The present invention is distinctively unique because:

- it accommodates varying sizes of product;
- there is substantially no empty space within the packing unit;
- curved surfaces of the food avoid contact with flat rigid surfaces or corners of the package; and
- flat surfaces and corners of the food avoid, or have substantially minimal contact with flexible surfaces of the package.

It is conventional to vacuum pack seafood for sanitary handling. However, conventional vacuum packing damages delicate tuna meat by rounding and deforming the cut corner areas. The exposed corners of the loin are the most susceptible areas to damage. The meat at the corner of the loin where the two cut sides meet the center of the fish is the softest area of the fish. The present invention uses a plurality of rigid supports to form joints that protect these corners from damage and deformation. Further, it was discovered unexpectedly that fitted joints can reform damaged or deformed corners, restoring the loin to its original fresh cut appearance. Such fine detailing of the intricate edge work of the loin gives a valuable fresh cut appearance, which combined with cost savings, enhances the packaged loin's ability to compete with domestically cut loins.

My loin process is suitable for cost efficient assembly line production and provides an opportunity to utilize lower cost foreign labor. Discarding the trimming waste before shipping reduces airfreight cost. Reduced processing and delivery costs results in a lower and more competitive market price.

Fresh fish is typically air-flown from foreign resources such as the Pacific fisheries to the U.S. on ice in H & G form a whole fish with the head, guts, tail, fins, and gills removed. The present estimated cost to net fish weight ratio for airfreight from South East Asia is approximately $1.92/lb. About 53% of this fish will be lost during filleting into loins so the per pound airfreight, calculated on the basis of edible tuna, increases to $4.09/lb. The resulting economic benefit of my invention allows higher grades of fresh raw material to be purchased for processing into tuna loins and savings to be passed on to the consumer as lower prices. The consumer receives a large economic benefit because air-flown tuna loins are much less expensive than tuna loins cut domestically from air-flown whole fish, due to the reduced airfreight cost of shipping loins.

BEST MODE FOR CARRYING OUT THE INVENTION

Figure 1:
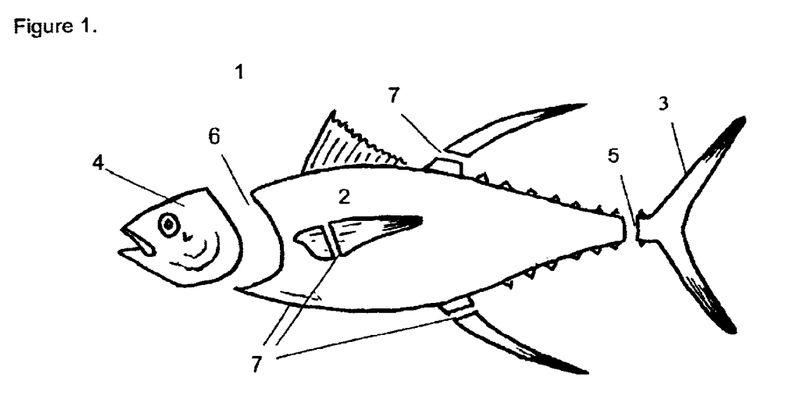
FIG. 1 is a side view of a tuna.

Referring to FIG. 1, a side view of a tuna 1 in its upright position shows a substantially oval or elliptical profile, tapered from the body 2 towards the tail 3 and head 4. Two cuts are made 5 and 6, perpendicular to the backbone, separating the tail 3 and head 4 from the body of the fish 2. Additional cuts are made removing the fins and entrails 7. The remaining body of the fish 2 is commonly referred to as an H/G fish headed and gutted or whole fish, which is the conventional form in which tuna are traded and transported from foreign countries into the U.S. market.

Whole tuna are filleted by cutting the whole fish vertically and horizontally through an axis defined by the backbone of the fish to form loins, each loin having two flat sides and an arc shaped side, defining corners where any of the sides meet.

Figure 2:
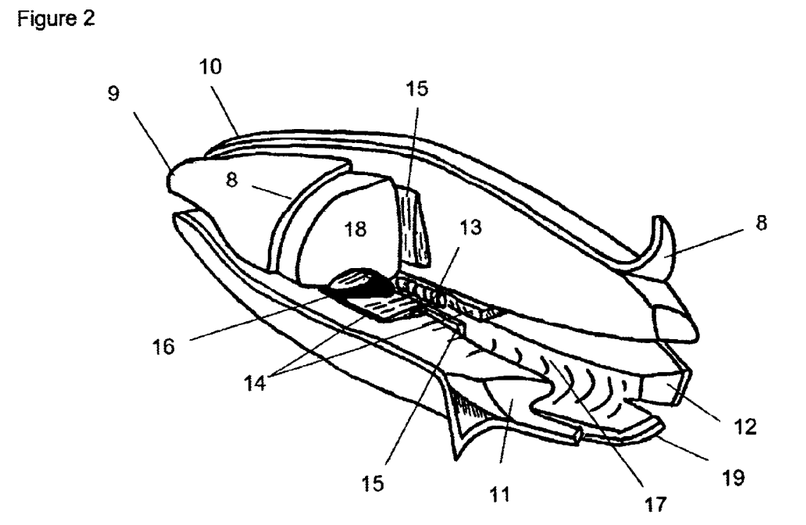
FIG. 2 is a cut-away exploded view of a gutted tuna.

Referring to FIG. 2, a cut-away exploded view of a gutted tuna has a substantially circular or oval cross section with an outlining skin of the fish 8, with four distinctive quarter sections defining loins, each having a V shaped cross section. Therefore, a whole tuna viewed in an upright position contains four loins; a left top loin 9, a right top loin 10, a left bottom loin 11, and a right bottom loin 12. A backbone is located at the center of the fish 13, connected to the horizontal ribs 14 and vertical ribs 15. The blood meat 16 is located between the back 9 and 10 and belly 11 and 12 loins. A voided area is located at the bottom of the fish where the entrails were removed 17.

The back loins 9 and 10 are separated from the belly loins 11 and 12 by making horizontal cuts running between the head and tail above and below the horizontal ribs 14, along both sides of the fish Adjoining back loins 9 and 10 are separated by making vertical cuts running between the head and tail along the right side and left side of the vertical ribs 15 at the top of the fish. Adjoining belly loins 11 and 12 are separated by making vertical cuts running between the head and tail to the right side and left side of the vertical ribs 15 at the bottom of the fish.

A cross section of a tuna loin at any point is a substantially triangular pie shape 18, except near the belly area of the loins where the entrail cavity 17 displaces meat, thus the loin becomes rectangular with the belly removed. There are a number of variations of loin preparation, which vary according the market preference. Some common processing variations include removal of the skin 8 blood meat 16, and belly flap 19, in addition to trimming off the loin area near the tail and head nape deep into the body of the fish. Removal of the blood meat 16, horizontal and vertical ribs 14 and 15, can reduce the V angle of loin cross section 18 to less than 90 degrees.

Figure 3:
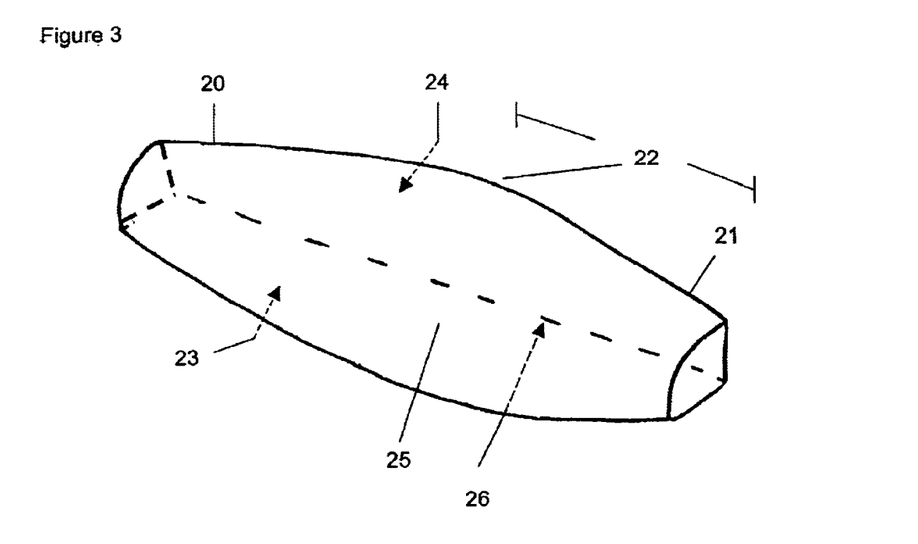
FIG. 3 is a perspective view of a full tuna loin.

Referring to FIG. 3, the full tuna loin is substantially tapered at the tail area 20 and the nape area 21, with its broadest point 22 being approximately 40% of the distance from the nape towards the tail. Each full loin has one horizontal cut side 23, one vertical cut side 24, and one naturally contoured skin side 25. The horizontal and vertical cut sides as manifested in the whole fish run straight and flat between the head area 21 and tail area 20, forming a corner where they meet 26. The skin side of the loin 25 is contoured to the natural fish shape.

In the case of larger size seafood species such as tuna and swordfish, a "full-loin" is defined as a ¼ section of the fish that runs substantially the full length of the fish body. However, it may be preferred to cut full-loins into loin sections, such as ½ loin-sections ⅛ of the fish or 113 loin-sections 1/12 of the fish in order to conform the fillet to the package size, market specifications, or for other reasons. In the case of small and medium size seafood species such as mahi-mahi, snappers, and other bottomfish, a full loin may be a ½ section of the whole fish running the full length of the fish body, resulting in a right half and left half of the fish. For purposes of this invention a loin is distinguished from fillets in that the minimum amount of cuts are made to remove the bones from the whole fish and optionally other non-edible portions of the fish so that the boneless portions remain in as much of a whole form as possible, forming a full-loin. A full-loin runs the fill length of the fish body, while the length of a loin-section is less than the full length of the fish body. It is the intention of this invention to maintain the bodily structure, shape, and appearance of full-loins, loin-sections, and further processed fillets to resemble the physical characteristics as they were manifested in the whole fish.

The muscle structure of fresh seafood meat is delicate and vulnerable to damage. When a loin is removed from the rigid skeletal support, the delicate muscle becomes susceptible to damage, contortion and deformation that distort the original shape of the loin as it is manifested within the whole fish. Cutting whole fresh fish into a larger number of small fillets increases the fillets fragility and vulnerability to damage. By replacing the heavy skeletal structure and other supportive part of the whole fish with my lightweight and sanitary supporting means, all forms of seafood fillets can be protected and their original physical shape maintained.

Figure 4:
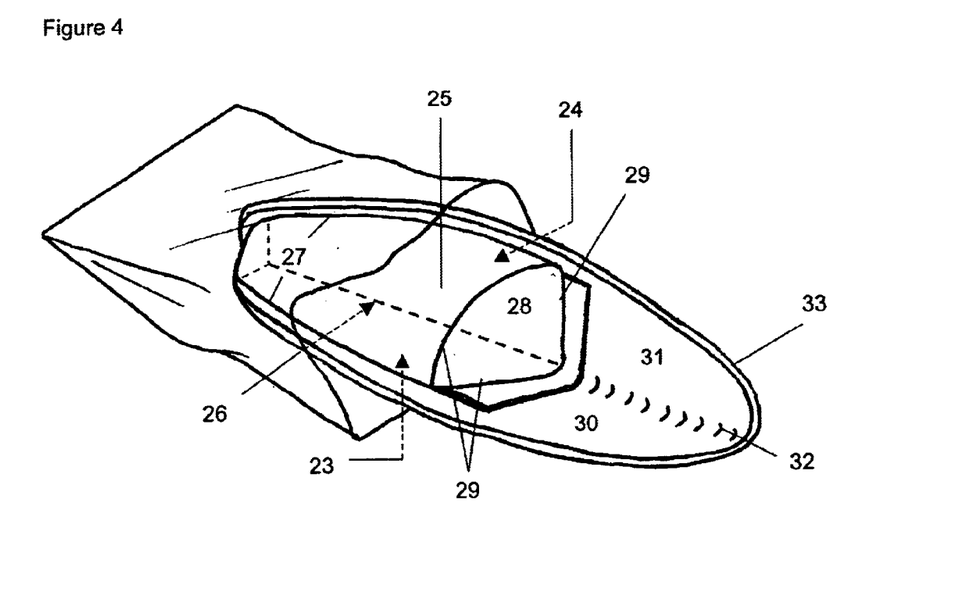
FIG. 4 is a cut-away view of a top-left tuna loin in a supporting means according to the present invention.

Referring to FIG. 4, a cut-away view of a top-left tuna loin in a supporting means shows a flat horizontal cut side 23, and flat vertical cut side 24, and an arch-shaped skin side 25 that follows the natural curvature of the whole fish. The two cut sides of the loin 23 and 24 intersect at angles to one another preferably 90 degrees or less forming a curved corner 26 at the centermost area of the fish near the backbone where the tuna meat is softest and most delicate. The cutsides of the loin 23 and 24 intersect with the natural contoured skin side of the loin 27 forming sharp angled corners. Each cross sectional cut separates the full loin into loin sections, steaks, or fillets creating additional faces 28 and corners 29 where the filleted loin face intersects with the sides of the loins 23, 24 and 25.

Seafood fillets are commonly packed in plastic or sealed vacuum bags for sanitary handling. However, such packing can result in rounding, distortion, and damage of the intricately cut corners 26, 27 and 29, the flat side cuts 23 and 24, the flat face cuts 28. Maintaining precision edgework with sharp cut corners, undamaged curved corners, flat cut surfaces, and natural contours details the vitality of seafood fillets.

The natural shape of full loins has a triangular pie shaped cross section, broad in the middle and tapered at the tail and nape areas. Such a shape does not conform well to the internal space of a typical rectangular shipping carton. Therefore, packing tends to bulge the carton near its middle area and contort the tuna loins to an unnatural deformed shape. Further, the tapered tail and nape leaves abundant voided space near the carton ends causing shifting of the loins and contortions. Frozen blocks of gel-ice or dry ice added into the carton as refrigerant cause additional damage by denting and smashing the delicate seafood meat.

The supporting means of this invention eliminates or substantially minimizes damage to seafood fillets during packing, handling, transportation, and storage. The supporting means for full loins of tuna consist of a horizontal rigid support 30 and a vertical rigid support 31 that run from the tail 20 to the nape 21 and protect the horizontal and vertical cut surfaces 23 and 24. The, horizontal rigid support 30 and vertical rigid support 31 intersect to create a curved V shape groove 32 to protect the curved loin corner 26, which runs straight and lengthwise along an axis defined by the backbone of the fish. The cross-member positioned of rigid supports splint the loin in its natural lengthwise and widthwise position. The rigid supports 30 and 31 branch out from the V groove intersection 32 and keep the cut sides 213 and 24 flat and corners 27 sharp.

The angle between the horizontal rigid support 30 and vertical rigid support 31 depends on the loin preparation, however it has been empirically determined to be in an operable range from 40 degrees to 100 degrees, a preferred range from 50 degrees to 95 degrees, and an optimal range from 60 degrees to 90 degrees. The inside corner of the V shaped intersection 32 is curved to match the curvature of the loin corner 26 which is unexpectedly convexity curved and not sharp, because the backbone displaced meat that would be necessary to form a sharp corner and the remaining meat relaxes into a rounded corner when the backbone is removed. The curve inside the V shaped intersection 32 depends on the size of the fish from which the loin is cut. We have empirically determined that an operable curve inside the V shaped intersection 32 follows a radius greater than 1/8 inch for loins cut from small tuna and less than 3 inches for loins cut from very large tuna. For loins cut from whole tuna in the size range of 20 pounds to 200 pounds, the curve inside the V shaped intersection 32 is in an operable range from a radius of 3/16 inch to 2 inches, a preferred range from a radius of 1/4 inch to 1 inches, and an optimal range from a radius of 3/8 inch to 3/4 inches. Although not preferred, a sharp corner can be provided at the V shaped intersection 32. However, this results in a loin with a sharp corner that does not appear natural.

Other flat rigid supports can be added or mated to create additional flat surfaces and V shaped intersections protecting any additional cut surfaces and corners. It's preferred that all the other V shaped intersections be sharp. Flat rigid supports and V shaped intersections are added to support and protect as many flat cuts and corners as necessary. The rigid supports can be curved or molded to conform and protect any curved or contoured areas such as the skin side 25. Rigid supports made of lightweight sanitary plastic have an operable thickness range from 0.5 millimeters to 8 millimeters, a preferred thickness range from 1 millimeter to 4 millimeters, and an optimal thickness range from 2 millimeters to 3 millimeters, or have suitable thickness to substantially maintain and protect the cut surfaces and corners of the food. Rigid supports made of cardboard have an operable thickness range from 1 millimeter to 14 millimeters, a preferred thickness range from 2 millimeters to 6 millimeters, and an optimal thickness range from 3 millimeters to 4 millimeters, or have suitable thickness to substantially maintain and protect the cut surfaces and corners of the food. Alternatively, the rigid supports can be made of any corrugated or non-corrugated plastic, paper stock, natural or synthetic stock that provide sufficient stiffness to maintain the cut surfaces and corners of the food, however, preferably lightweight, compact, and sanitary.

The rigid support material can be formed into a V shape by numerous methods, including but not limited to folding, molding, bending, taping, sealing, and gluing. A curved intersection can be incorporated when the rigid supports are formed into a V shape. For example, the pattern of the rigid supports can be formed by tracing the cut sides of the loin on cardboard (cutting the pattern with a razor) and forming a curved joint by folding the cardboard over a rounded dowel (preferably with a diameter of approximately 1 inch). Alternatively, the rigid supports can be formed into a V shape with a pointed intersection and the inside of the pointed V intersection filled with a material to round its shape. For example, corrugated cardboard is desirable because it is readily available, lightweight, and economical. But, in some cases corrugations may extrude when the cardboard is formed into a curved V shape intersection Such extrusions could leave undesirable corrugation marks on the fish. To solve this problem or for preference, cardboard is folded into a V shape with a sharp angled intersection and soft paper (such as paper towel) is placed inside the V. Thus, the rigid supports form a joint with a rigid outer cardboard shell and a soft inner cushion to protect the curved corner of the fish and to fill the space void or smooth out irregularities.

Figure 5:
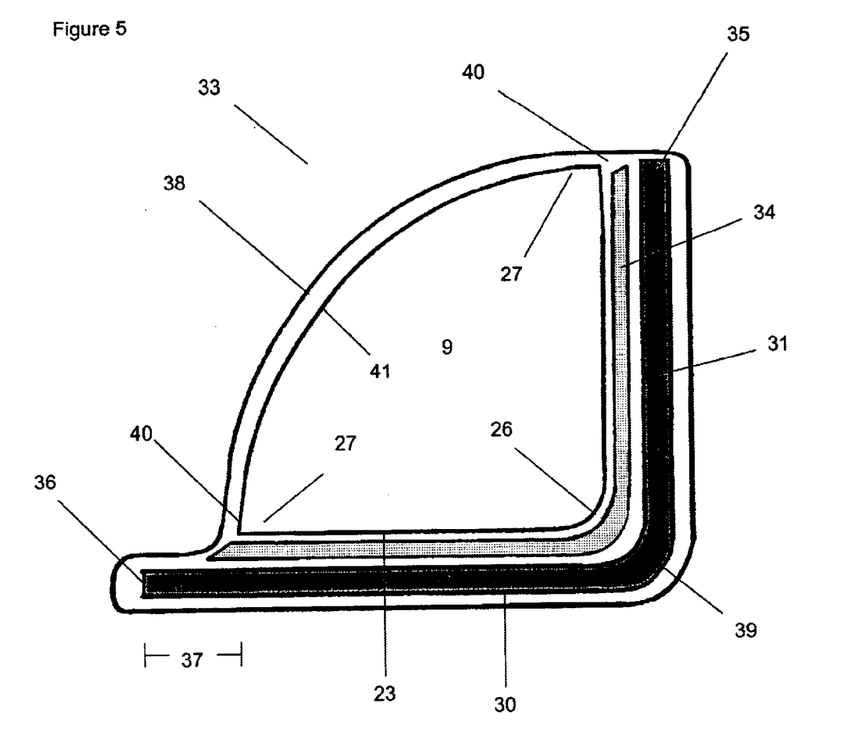
FIG. 5 is an end cut-away view of a loin inside a supporting means according to the present invention.

A tuna loin is provided and optionally treated with gas or liquid to preserve the color or microbial condition of the seafood. Referring to FIG. 5, the loin 9 is placed inside the supporting means 33. An absorbent means 34 is preferably added between the loin 9 and the rigid supports 30 and 31 to eliminate excess moisture. The absorbent means can be added independently or incorporated into the rigid supports 30 and 31. The rigid supports 30 to 31 are preferably internally formed from a single sheet of material, such as by being folded over a dowel, as described above.

The rigid supports 30 and 31 are shaped to a V pattern that accommodates a variable size range of fillets. The flat rigid supports 30 and 31 rest against the cut sides of the loin 23 and 24 and keep the cuts flat. The rigid supports 30 and 31 preferably extend to cover the fill area of the cut sides of the loin 23 and 24 and may extend beyond the loin 37. The maximum size fillet is when the corner of the fillet 27 is flush with the side edge of the rigid support 35. The excess rigid support material 37 extending beyond the corner of the loin 27 can be trimmed. The optimal range 37 from the corner of the fillet 27 to the outside edge of the rigid support 36 is no more than 1 inch The preferred range 37 from the corner of the fillet 27 to the outside edge of the rigid support 36 is no more than 2 inches. The operable range 37 from the corner of the fillet 27 to the outside edge of the rigid support 36 is no more than 3 inches.

At least two rigid supports 30 and 31 are combined to form a supporting means. A flexible membrane preferably made of a waterproof impermeable or semi-permeable gas barrier plastic 38 holds together and seals the supporting means. The air is removed from inside the flexible membrane 38, which draws it against the skin side face of the loin 41, maintaining its natural curved shape. A unique feature of my invention is to incorporate (by hermetically sealing or other means) the rigid supports 30 and 31 into a flexible membrane such as a vacuum bag forming a single supporting means packing unit product.

There are a number of alternatives in which the supporting means and flexible membrane can be combined. For example, the rigid support can be separate pieces inside or outside the flexible membrane, or the rigid supports can be formed independently and a skin-film adhered directly to the rigid supports.

After vacuum packing, the plastic membrane 38 will hold the assembly together and joints will be formed to protect the corners of the fillets 26 and 27. My supporting means defines three types of joints:

1. A "fitted joint" is at least two rigid supports set in a V shape forming an intersection.
2. A "semi-fitted joint" is a V shaped intersection with at least one rigid support and at least one flexible membrane.
3. A "capped joint" is at least two rigid supports set in a V shape with a pointed intersection and the inside of the pointed V intersection is filled with a material to form a curved intersection.

A two-sided fitted joint is an intersection 39 made of two rigid supports 30 and 31 set in a V shape to maintain or form the corner of the cut food 26. The angle of the intersection can be sharp for foods with sharp corners or rounded for foods with rounded corners. Adding a third rigid support surface to the V shaped intersection will form a three-sided fitted-joint.

A fitted joint with a sharp V shaped intersection evolves into a capped joint when material is wedged inside the pointed V shaped intersection to round the inside pointed area. A two-sided fitted joint evolves into a three-sided fitted joint where two parallel intersecting rigid supports 30 and 31 intersect with a cross-plane third rigid support surface. A two-sided fitted joint evolves into a three-sided semi-fitted joint where the two parallel intersecting rigid supports 30 and 31 intersect with a third cross-plane flexible membrane surface. A two-sided semi-fitted joint 40 evolves into a three-sided semi-fitted joint where it intersects with a third cross-plane rigid or semi-rigid side. The angle of the rigid supports 30 and 31 can be fixed or adjusted to replicate the angle of the cut surfaces of the fillet 23 and 24; the point where the rigid supports 30 and 31 meet to form the fitted-joint 39 is perfectly fitted to the corner of the fillet 26. The number of seafood fillet corners that are not protected by rigid, capped, or semi-rigid joints should be eliminated or substantially minimized. It is the high percentage of cut sides protected a with rigid support and corners protected with rigid, capped, or semi-rigid joints of my invention that preserves and restores detailed edgework and craftsmanship of the freshly cut food.

To protect physical characteristics of cut food, rigid supports, fitted, capped, or semi-fitted joints should be used to protect the cut surfaces and corners. The percentage of cut surface area protected by rigid supports is optimally at least 90%, preferably at least 70%, and operably at least 55%. The running distance of two-sided cut corners protected by fitted, capped, or semi-fitted joints are optimally 90%, preferably at least 80%, and operable at least 60%. The percentage of three-sided cut corner peaks protected by three-sided rigid or semi-joints are optimally 100%, preferably at least 90%, and operable at least 70%.

Figure 6:
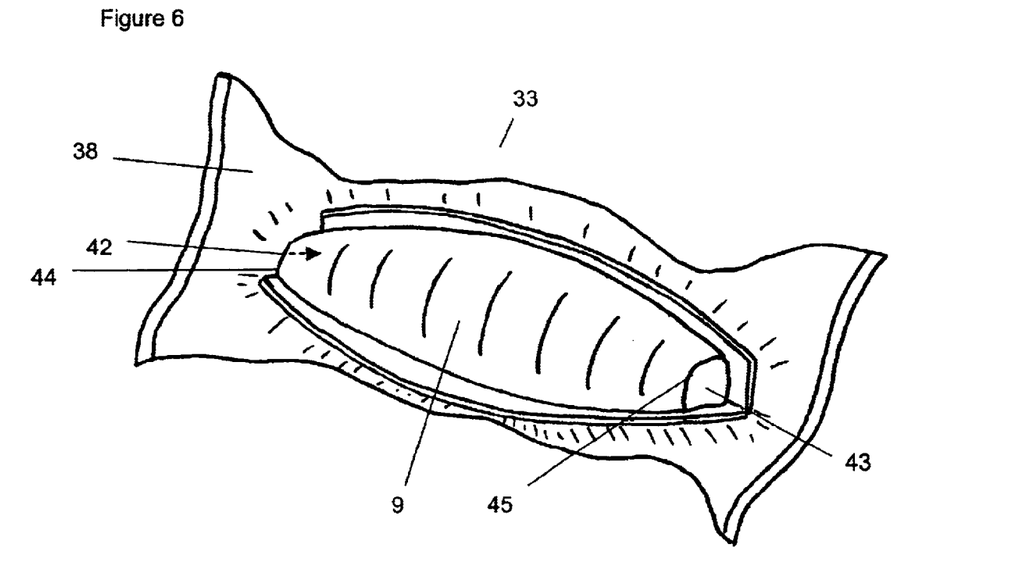
FIG. 6 is a perspective view of a tuna loin vacuum packaged in a supporting means according to the present invention.

Referring to FIG. 6, a top left tuna loin 9 is optimally vacuum packaged in my supporting means 33 with at least 90% of the cut surface area protected with rigid supports, at least 90% of the running distance of cut corners protected with fitted or semi-fitted joints, and 100% of the three-sided cut corner peaks protected by three-sided rigid or semi-joints. In this example, a small percentage of flat cut surfaces are unprotected at the tail and nape 42 and 43 and two small corners 44 and 45 are unprotected by non-fitted joints. The supporting means is ideally held intact by a flexible membrane and vacuum pressure such as with a vacuum bag, however overlaps such as tape can be used as an alternative or precaution against vacuum failure. The air within the package can be eliminated by vacuum pressure, submersing the sealed parts of the package under water, or any other means to substantially remove the air surrounding the product to achieve either a tight or loose vacuum package. The intact supporting means assembly will maintain the physical characteristics of a freshly cut fillet or restore damaged corners or cut surfaces to their original freshly cut condition. An optional temperature-monitoring device is added to monitor the present temperature of the package or to provide historical temperature information.

Figure 7:
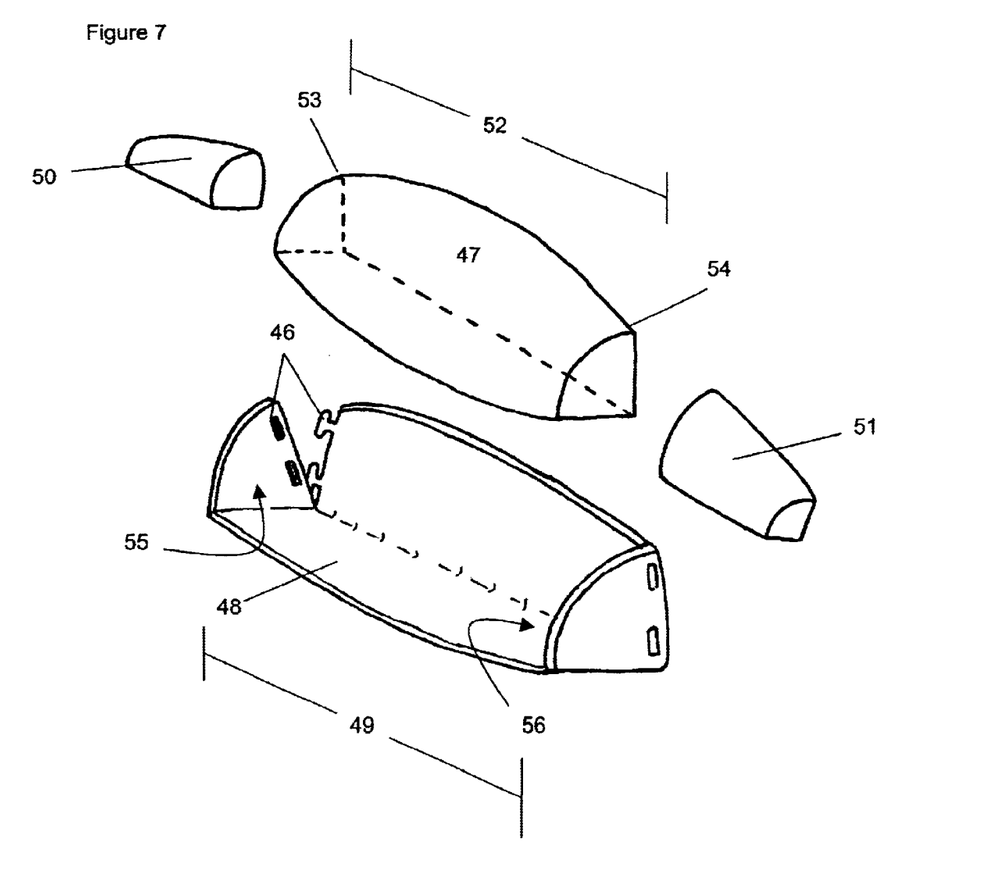
FIG. 7 is a perspective view of a one-piece folding rigid support receiving a finished center cut loin section.

Loins can be further processed into loin sections, steaks or other fillet cuts and packaged into my supporting means. Referring to FIG. 7, a one-piece folding rigid support is formed with a fastening means 46 that holds the rigid support assembly 48 in a fixed three-dimensional position. However, the rigid support 48 can be stored and shipped economically in a flat two-dimensional form. The finished center cut loin section 47 is received in a center cut rigid support 48 with a fixed length 49, which is efficiently packaged into shipping cartons with an internal dimension slightly greater than the fixed length 49. The center cut rigid support accommodates a size range of high value center cut loin sections, without the lower value tail section 50 and nape 51 section. Such preparation increases the product value and economizes airfreight by further reducing the quantity of lower value meat 50 and 51 subjected to high airfreight cost. The length 52 of the center cut loin section 47 between the tail end 53 and the nape end 54 is substantially the same as the internal length 49 of the rigid support between its left end 55 and its right end 56. The height of the rigid support can be less at either end of the rigid support 55 or 56 to accommodate a size range of ½ loin sections that would be tapered at the tail end or nape end. The rigid support containing the center cut loin sections is sealed within a flexible membrane to form a supporting means packaged optimally with 100% of the cut surfaces protected with rigid supports and 100% of the running corner distance protected by either fitted or semi-fitted joints. Further, if the center cut loin section is prepared with the skin on, then fitted joints protect 100% of the corners because the skin acts as a rigid support.

Figure 8:
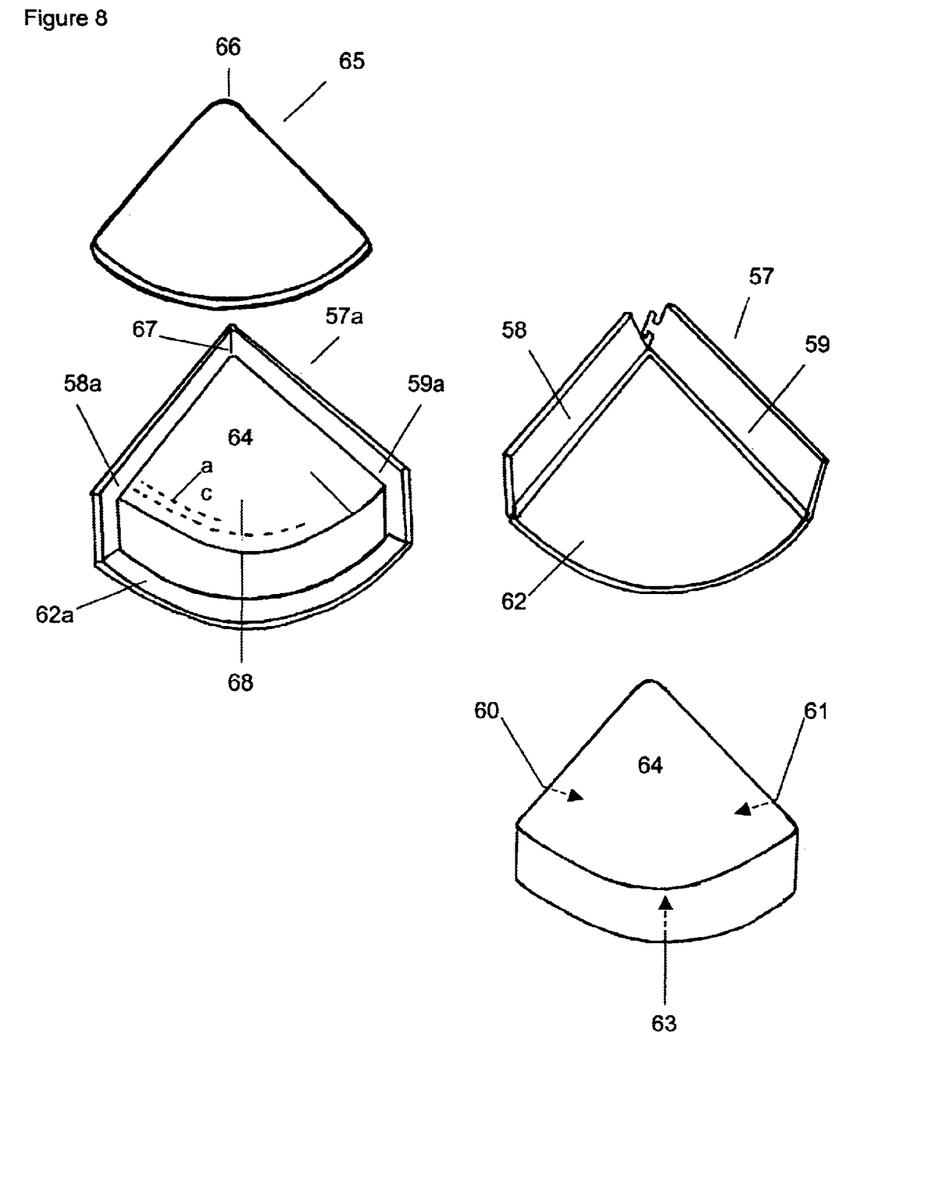
FIG. 8 is a perspective view of a one-piece rigid support assembly for serving size fillet portions.

Cutting seafood into serving size fillet portions substantially increases the fillets vulnerability to damage. In comparison, a single unit 15-pound tuna loin contains 4 cut surface, 9 two-sided corners, and 6 three-sided corner peaks. Cutting a 15-pound tuna loin cross sectionally into eight ounce steaks will increase to 30 steaks units, 120 cut surfaces, 270 two-sided corners, and 180 three-sided corner peaks. Referring to FIG. 8, a one-piece rigid support assembly 57 with a left side 58 and right side 59 protects the flat cut edges and corners of the fillet 60 and 61 and a bottom rigid support 62 protect the bottom face of the fillet 63. The one-piece assembly containing the fillet 57a is then sealed with a flexible membrane to complete the supporting means with the cut surfaces protected by rigid supports in a preferred range of at least 66%, two-sided corners protected by fitted or semi-fitted joints in a preferred range of at least 80%, and three-sided corner peaks protected by three-sided fitted or semi-fitted joints in an optimal range of 100%. Only one corner 68 and one cut surface 64 are unprotected. Optionally, an additional rigid support 65 can be added to make a two-piece supporting means. The second rigid support 65 is placed flush against the face on the fillet 64 with its corner 66 fitted into the mating corner 67 of the first rigid support assembly. The V shape of the rigid support assembly accommodates a range of fillet sizes a, b and c. The rigid support material for small fillets can be of less thickness than that specified for larger loin sections. The excess rigid support material 58a, 59a and 62 can be trimmed. The two-piece assembly is preferably vacuum-sealed with a flexible membrane to complete a supporting means with an optimal 100% of cut surfaces and corners protected by rigid supports.

Full loins, representing ¼ of the fish body will vary in size. However, each have the common characteristics of: four flat cut surfaces, one naturally contoured surface, nine two-sided corners, six three-sided corner peaks, and a pie shape cross section. Further, by making cross-sectional cuts, 9 full loins can be processed into loin sections, steaks, or other fillets that, vary in size, but each maintain these same common characteristics. This commonality of characteristics provides for a best mode supporting means with three rigid supports a horizontal rigid support 30, a vertical rigid support 31, and one end support 55 or 56 that effectively accommodates the variability in size while maintaining the craftsmanship of the cut surfaces and corners in the optimal or preferred ranges by protecting: three of four flat cut surfaces with rigid supports, eight of nine two-sided intersecting corner with fitted or semi-fitted joints, and six of six three-sided corner peaks with fitted or semi fitted joints.

Seafood fillets and other freshly cut food products of all types can be packaged in the spirit of my invention following these same principles, ratios, and formulas to preserve the fresh cut physical characteristics for distribution while fresh or subsequently frozen. Although the present invention has been described in connection with particular preferred embodiments, there are other embodiments that fall within the spirit and scope, the invention as defined by the claims. Accordingly, no limitations are to be implied or inferred except as specifically and explicitly set forth in the claims.

What is claimed:

1. An assemblage, comprising:
    a boneless cut of seafood having at least two cut surfaces each having a cut surface area, wherein said cut surfaces intersect to form a two-sided cut corner having a cut corner length;
    at least two intersecting substantially flat substantially rigid supports forming a two-sided brace defining a fitted joint having an intersection;
    wherein said cut corner of said boneless cut of seafood is inserted in and protected by said fitted joint, such that a portion of each of said cut surfaces of said boneless cut of seafood rests against and is supported by said rigid support.

2. A assemblage according to claim 1, further comprising:
    curving material substantially conforming to any convexity along said cut corner length placed within a portion of said intersection of said fitted joint;
    wherein said cut corner of said boneless cut of seafood is inserted in said fitted joint, such that said convexity conforms to and is supported by said curving material.

3. An assemblage, comprising:
    a boneless cut of seafood product having a substantially V-shaped cross-section defined by at least two flat cut surfaces each having a cut surface area, wherein said cut surfaces intersect to form a two-sided cut corner having a corner angle and a cut corner length, said boneless cut of seafood having a contoured side intermediate between said cut surfaces and opposite said corner angle;
    at least two substantially flat substantially rigid supports intersecting in a V shape to form a two-sided brace defining a fitted joint having an intersection with a support angle;
    wherein said support angle is substantially equal to said corner angle;
    wherein said two-sided cut corner of said boneless cut of seafood is inserted into and protected by said intersection of said fitted joint, such that a portion of each of said cut surfaces of said boneless cut of seafood conforms to and is supported by said supports.

4. An assemblage according to claim 3, further comprising:
    curving material substantially conforming to any convexity along said cut corner length placed within a portion of said intersection of said fitted joint;
    wherein said two-sided cut corner of said boneless cut of seafood is inserted into said fitted joint, such that said convexity conforms to and is supported by said curving material.

5. An assemblage, comprising:
    a boneless cut of seafood having a plurality of cut surfaces each having a cut surface area, wherein the intersections between three of said cut surfaces form three-sided cut corner peaks and the intersections between two of said cut surfaces in said three-sided cut corner peaks form two-sided cut corners, wherein each of said two-sided cut corners has a corner angle and a cut corner length, and said boneless cut of seafood has a contoured surface intermediate between said cut surfaces, the intersection between said cut surfaces and said contoured surface forming contour corners;
    a plurality of intersecting substantially flat substantially rigid supports;
    wherein three of said supports substantially perpendicularly intersect each other to form a three-sided brace, wherein said three-sided brace defines a three-sided fitted joint;
    wherein two of said supports in said three-sided brace form a two-sided brace, wherein said two-sided brace defines a two-sided fitted joint having an intersection with a support angle within said three-sided brace;

said support angle is substantially equal to said corner angle;

wherein said three-sided cut corner peak is inserted into said three-sided fitted joint, such that said three intersecting cut surfaces forming said three-sided cut corner peak rest against said three-sided brace;

wherein said two-sided cut corner is inserted into said two-sided fitted joint, such that portions of said two intersecting cut surfaces forming said two-sided cut corner rest against said two-sided brace; and wherein each of said cut surfaces conforms to and is supported by one of said rigid supports;

wherein said rigid supports do not contact said contoured surface except along a contour corner;

such that the sharpness of said three-sided cut corner peaks and said two-sided cut corners in said joints is maintained and restored to preserve the valuable fresh-cut appearance of said boneless cut of seafood; and such that varying sizes and shapes of said boneless cut of seafood can be accommodated.

6. An assemblage according to claim 5, further comprising:

curving material substantially conforming to any convexity along said cut corner length placed within a portion of said intersection of said two-sided fitted joint; and wherein said two-sided cut corner of said boneless cut of seafood is inserted into said fitted joint, such that said convexity conforms to and is supported by said curving material.

7. An assemblage, comprising:

a boneless cut of seafood having a plurality of cut surfaces, each having a cut surface area, and at least one contoured surface, wherein said cut surfaces intersect with each other to form two-sided cut corners, each cut corner having a corner angle and a cut corner length, wherein said cut surfaces and said contoured surface intersect to form contour corners;

a plurality of intersecting substantially flat substantially rigid supports;

wherein said supports intersect to form a plurality of two-sided braces, each of said braces defining a fitted joint having an intersection with a support angle;

wherein each of said support angles is substantially equal to a corresponding one of said corner angles;

wherein a cut corner is inserted into corresponding fitted joint, such that a portion of a cut surface of said boneless cut of seafood rests against and is supported by a corresponding one of said supports, and a portion of a contour corner rests against and is supported by one of said supports; and wherein said supports do not contact said contoured surface except along a contour corner;

such that the sharpest of said cut corners and contour corners is maintained and restored to preserve the valuable fresh-cut appearance of said boneless cut of seafood; and such that varying sizes and shapes of said boneless cut of seafood can be accommodated.

8. An assemblage according to claim 7, further comprising:

curving material substantially conforming to any convexity along a portion of one of said cut corner lengths placed within a portion of said intersection of a convexity one of said fitted joints;

wherein a two-sided cut corner of said boneless cut of seafood having a convexity along a portion of one of said corner lengths is inserted into a said convexity one of said fitted joints, such that said convexity along a portion of one said corner lengths conforms to and is supported by said curving material within said convexity one of said fitted joints.

9. An assemblage, comprising:

a boneless cut of seafood having a horizontal cut side having a horizontal cut surface area, a vertical cut side having a vertical cut surface area, and a contoured side between said horizontal cut side and said vertical cut side, wherein said horizontal cut side and said vertical cut side intersect to form a cut corner having a cut corner length, said contoured side and said horizontal cut side intersect to form a horizontal contour corner, and said contoured side and said vertical cut side intersect to form a vertical contour corner;

a horizontal rigid support;

a vertical rigid support;

wherein said horizontal rigid support and said vertical rigid intersect to form a two-sided brace defining a fitted joint having an intersection;

wherein said cut corner is inserted into said fitted joint, such that portion of said horizontal cut side and said horizontal contour corner rest against and are supported by said horizontal rigid support and portions of said vertical cut side and said vertical contour corner rest against and supported by said vertical rigid support;

wherein said rigid supports do not contact said contoured side except along a contour corner;

such that the sharpness of said corners is maintained and restored to preserve the valuable fresh-cut appearance of said boneless cut of seafood; and such that varying sizes and shapes of said boneless cut of seafood can be accommodated.

10. An assemblage according to claim 9, further comprising:

curving material substantially conforming to any convexity along said cut corner length placed within a portion of said intersection;

wherein said cut corner of said boneless cut of seafood is inserted in said fitted joint such that said horizontal cut side and said horizontal contour corner rest against and are supported by said horizontal rigid support, said vertical cut side and said vertical contour corner rest against and are supported by said vertical rigid support, and said convexity of said cut corner conforms to and is supported by said curving material within said intersection.

11. An assemblage, comprising:

a boneless cut of seafood having at least two cut surfaces each having a cut surface area, wherein said cut surfaces intersect to form a two-sided cut corner having a cut corner length;

at least one substantially rigid support formed in a V shape to form a two-sided brace defining a sharp intersection substantially conforming to a portion of said cut corner length;

wherein said cut corner of said boneless cut of seafood is inserted in said brace, such that a portion of each of said cut surfaces of said boneless cut of seafood rests against and is supported by one of said rigid supports and said cut corner conforms to and is supported by said intersection.

12. An assemblage, comprising:
- a boneless cut of seafood having at least two cut surfaces having a cut surface area, wherein said cut surfaces intersect to form a two-sided cut corner having a cut corner length;
- at least one substantially rigid support formed in a V shape to form a two-sided brace defining a fitted joint having a curved intersection substantially conforming to any convexity along said cut corner length;
- wherein said cut corner of said boneless cut of seafood is inserted in said fitted joint, such that a portion of each of said cut of said boneless cut of seafood rests against and is supported by said rigid supports and said convexity of said cut corner conforms to and is supported by said curving intersection.

13. An assemblage according to any one of claims 1 to 12, further comprising:
- a flexible membrane enclosing said supports and said boneless cut of seafood;
- such that said supports and said boneless cut of seafood can be vacuum sealed within said flexible membrane and said flexible membrane holds said boneless cut of seafood against said supports.

14. An assemblage according to any one of claims 1 to 12, wherein at least 60% of a cut surface area is supported by a support.

15. An assemblage according to any one of claims 1 to 12, wherein at least 60% of a cut corner length is supported by a joint.

16. A process to support boneless cuts of seafood having at least two cut surfaces each having a cut surface area, wherein said cut surfaces intersects to form a two-sided cut corner having a convex cut corner length, during the processing, handling, transportation and distribution of said boneless cuts of seafood, comprising the steps of:
- providing a brace having a fitted joint defined by two intersecting substantially flat substantially rigid supports forming an intersection; and
- inserting said out corner of said boneless cut of seafood into said intersection, such that said cut corner of said boneless cut of seafood is inserted in and protected by said fitted joint, such that a portion of each of said cut surfaces of said boneless cut of seafood rests against and is supported by said rigid supports.

17. A process according to claim 16, further comprising:
- enclosing said supports and said boneless cut of seafood in a flexible membrane; and vacuum sealing said supports and said boneless cut of seafood within said flexible membrane.

* * * * *